United States Patent
Gordon et al.

(10) Patent No.: US 9,944,291 B2
(45) Date of Patent: Apr. 17, 2018

(54) CONTROLLING DRIVING MODES OF SELF-DRIVING VEHICLES

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 14/924,034

(22) Filed: Oct. 27, 2015

(65) Prior Publication Data

US 2017/0113689 A1    Apr. 27, 2017

(51) Int. Cl.
*B60W 30/182*    (2012.01)
*G05D 1/00*    (2006.01)
*G05D 1/02*    (2006.01)
*B60W 40/04*    (2006.01)
(Continued)

(52) U.S. Cl.
CPC ...... *B60W 30/182* (2013.01); *B60W 30/0956* (2013.01); *B60W 40/04* (2013.01); *B60W 50/0098* (2013.01); *G05D 1/0055* (2013.01); *G05D 1/0214* (2013.01);
(Continued)

(58) Field of Classification Search
CPC .......... B60W 30/0956; B60W 30/182; B60W 40/04; B60W 50/0098; B60W 2050/0014; B60W 2550/30; B60W 2550/408; B60W 2750/30; G05D 1/0055; G05D 1/0214
See application file for complete search history.

(56) References Cited

U.S. PATENT DOCUMENTS

| 4,665,395 A | 5/1987 | Van Ness |
| 4,908,988 A | 3/1990 | Yamamura et al. |

(Continued)

FOREIGN PATENT DOCUMENTS

| CN | 1135063 | 11/1996 |
| CN | 2349068 Y | 11/1999 |
| CN | 201004265 Y | 1/2008 |
| CN | 202012052 | 10/2011 |
| CN | 202038228 U | 11/2011 |
| CN | 202772924 | 8/2012 |

(Continued)

OTHER PUBLICATIONS

U.S. Appl. No. 14/855,731 Non-Final Office Action dated Apr. 15, 2016.

(Continued)

*Primary Examiner* — Jerrah Edwards
*Assistant Examiner* — Donald J Wallace
(74) *Attorney, Agent, or Firm* — Law Office of Jim Boice

(57) ABSTRACT

A method and/or computer program product controls an operational mode of a self-driving vehicle (SDV) that is initially being operated in a nominal autonomous mode. Detectors on an SDV detect an erratically driven vehicle (EDV) that is being operated in an unsafe manner within a predetermined distance of an SDV. In response to detecting the EDV, a driving mode device in the SDV changes an operational mode of the SDV from the nominal autonomous mode to an evasive autonomous mode.

20 Claims, 8 Drawing Sheets

(51) Int. Cl.
*B60W 30/095* (2012.01)
*B60W 50/00* (2006.01)

(52) U.S. Cl.
CPC . *B60W 2050/0014* (2013.01); *B60W 2550/30* (2013.01); *B60W 2550/408* (2013.01); *B60W 2750/30* (2013.01)

(56) References Cited

U.S. PATENT DOCUMENTS

| | | | |
|---|---|---|---|
| 5,541,590 A * | 7/1996 | Nishio | B60K 28/14 |
| | | | 340/435 |
| 5,975,791 A | 11/1999 | McCulloch | |
| 6,064,970 A | 5/2000 | McMillian et al. | |
| 6,201,318 B1 | 3/2001 | Guillory | |
| 6,326,903 B1 | 12/2001 | Gross et al. | |
| 6,393,362 B1 | 5/2002 | Burns | |
| 6,502,035 B2 | 12/2002 | Levine | |
| 6,587,043 B1 | 7/2003 | Kramer | |
| 6,622,082 B1 | 9/2003 | Schmidt et al. | |
| 6,731,202 B1 | 5/2004 | Klaus | |
| 6,810,312 B2 | 10/2004 | Jammu et al. | |
| 7,124,088 B2 | 10/2006 | Bauer et al. | |
| 7,580,782 B2 | 8/2009 | Breed et al. | |
| 7,769,544 B2 | 8/2010 | Blesener et al. | |
| 7,877,269 B2 | 1/2011 | Bauer et al. | |
| 7,894,951 B2 | 2/2011 | Norris et al. | |
| 7,979,173 B2 | 7/2011 | Breed | |
| 8,031,062 B2 | 10/2011 | Smith | |
| 8,045,455 B1 | 10/2011 | Agronow et al. | |
| 8,078,349 B1 | 12/2011 | Prada Gomez et al. | |
| 8,090,598 B2 | 1/2012 | Bauer et al. | |
| 8,139,109 B2 | 3/2012 | Schmiedel et al. | |
| 8,140,358 B1 | 3/2012 | Ling et al. | |
| 8,146,703 B2 | 4/2012 | Baumann et al. | |
| 8,152,325 B2 | 4/2012 | McDermott | |
| 8,346,480 B2 | 1/2013 | Trepagnier et al. | |
| 8,352,112 B2 | 1/2013 | Mudalige | |
| 8,442,854 B2 | 5/2013 | Lawton et al. | |
| 8,466,807 B2 | 6/2013 | Mudalige | |
| 8,489,434 B1 | 7/2013 | Otis et al. | |
| 8,509,982 B2 | 8/2013 | Montemerlo et al. | |
| 8,583,365 B2 | 11/2013 | Jang et al. | |
| 8,660,734 B2 | 2/2014 | Zhu et al. | |
| 8,676,466 B2 | 3/2014 | Mudalige | |
| 8,678,701 B1 | 3/2014 | Aldasem | |
| 8,786,461 B1 | 7/2014 | Daudelin | |
| 8,793,046 B2 | 7/2014 | Lombrozo et al. | |
| 8,816,857 B2 | 8/2014 | Nordin et al. | |
| 8,874,305 B2 | 10/2014 | Dolgov et al. | |
| 8,880,270 B1 | 11/2014 | Ferguson et al. | |
| 8,903,591 B1 | 12/2014 | Ferguson et al. | |
| 8,924,150 B2 | 12/2014 | Tsimhoni et al. | |
| 8,948,955 B2 | 2/2015 | Zhu et al. | |
| 8,949,016 B1 | 2/2015 | Ferguson et al. | |
| 8,954,217 B1 | 2/2015 | Montemerlo et al. | |
| 8,954,252 B1 | 2/2015 | Urmson et al. | |
| 8,954,261 B2 | 2/2015 | Das et al. | |
| 8,958,943 B2 | 2/2015 | Bertosa et al. | |
| 8,965,621 B1 | 2/2015 | Urmson et al. | |
| 8,970,362 B2 | 3/2015 | Morley et al. | |
| 8,983,705 B2 | 3/2015 | Zhu et al. | |
| 8,996,224 B1 | 3/2015 | Herbach et al. | |
| 9,014,905 B1 | 4/2015 | Kretzschmar et al. | |
| 9,020,697 B2 | 4/2015 | Ricci et al. | |
| 9,024,787 B2 | 5/2015 | Alshinnawi et al. | |
| 9,082,239 B2 | 7/2015 | Ricci | |
| 9,123,049 B2 | 9/2015 | Hyde et al. | |
| 9,170,327 B2 | 10/2015 | Choe et al. | |
| 9,189,897 B1 | 11/2015 | Stenneth | |
| 9,194,168 B1 | 11/2015 | Lu et al. | |
| 9,216,745 B2 | 12/2015 | Beardsley et al. | |
| 9,278,689 B1 * | 3/2016 | Delp | B60W 30/00 |
| 9,286,520 B1 | 3/2016 | Lo et al. | |
| 9,305,411 B2 | 4/2016 | Ricci | |
| 9,317,033 B2 | 4/2016 | Ibanez-guzman et al. | |
| 9,390,451 B1 | 7/2016 | Slusar | |
| 9,399,472 B2 | 7/2016 | Minoiu-Enache | |
| 9,463,805 B2 | 10/2016 | Kirsch et al. | |
| 9,483,948 B1 | 11/2016 | Gordon et al. | |
| 9,628,975 B1 | 4/2017 | Watkins et al. | |
| 9,646,496 B1 | 5/2017 | Miller | |
| 2002/0022927 A1 * | 2/2002 | Lemelson | G01S 19/11 |
| | | | 701/301 |
| 2002/0026841 A1 | 3/2002 | Svendsen | |
| 2003/0050740 A1 * | 3/2003 | Fecher | B60K 35/00 |
| | | | 701/1 |
| 2003/0065572 A1 | 4/2003 | McNee et al. | |
| 2003/0076981 A1 | 4/2003 | Smith et al. | |
| 2004/0078133 A1 | 4/2004 | Miller | |
| 2004/0199306 A1 | 10/2004 | Heilmann et al. | |
| 2005/0104745 A1 | 5/2005 | Bachelder et al. | |
| 2006/0106671 A1 | 5/2006 | Biet | |
| 2006/0163939 A1 | 7/2006 | Kuramochi et al. | |
| 2006/0200379 A1 | 9/2006 | Biet | |
| 2006/0241855 A1 | 10/2006 | Joe et al. | |
| 2007/0100687 A1 | 5/2007 | Yoshikawa | |
| 2007/0124027 A1 | 5/2007 | Betzitza et al. | |
| 2008/0048850 A1 | 2/2008 | Yamada | |
| 2008/0114663 A1 | 5/2008 | Watkins et al. | |
| 2008/0129475 A1 | 6/2008 | Breed et al. | |
| 2008/0201217 A1 | 8/2008 | Bader et al. | |
| 2009/0094109 A1 | 4/2009 | Aaronson et al. | |
| 2009/0248231 A1 | 10/2009 | Kamiya | |
| 2009/0313096 A1 | 12/2009 | Kama | |
| 2010/0057511 A1 | 3/2010 | Mansouri et al. | |
| 2010/0156672 A1 | 6/2010 | Yoo et al. | |
| 2010/0179720 A1 | 7/2010 | Lin et al. | |
| 2010/0228427 A1 | 9/2010 | Anderson et al. | |
| 2010/0256852 A1 | 10/2010 | Mudalige | |
| 2011/0035250 A1 | 2/2011 | Finucan | |
| 2011/0077807 A1 | 3/2011 | Hyde et al. | |
| 2011/0137699 A1 | 6/2011 | Ben-Ari et al. | |
| 2011/0264521 A1 | 10/2011 | Straka | |
| 2012/0072243 A1 | 3/2012 | Collins et al. | |
| 2012/0139756 A1 | 6/2012 | Djurkovic | |
| 2012/0277947 A1 | 11/2012 | Boehringer et al. | |
| 2013/0030657 A1 | 1/2013 | Chatterjee et al. | |
| 2013/0113634 A1 | 5/2013 | Hutchinson et al. | |
| 2013/0131949 A1 | 5/2013 | Shida | |
| 2013/0141578 A1 * | 6/2013 | Chundrlik, Jr. | H04N 7/181 |
| | | | 348/148 |
| 2013/0144502 A1 | 6/2013 | Shida | |
| 2013/0222127 A1 * | 8/2013 | Ray Avalani | B60Q 9/008 |
| | | | 340/436 |
| 2013/0231824 A1 | 9/2013 | Wilson et al. | |
| 2013/0261871 A1 | 10/2013 | Hobbs et al. | |
| 2014/0019259 A1 | 1/2014 | Dung et al. | |
| 2014/0092332 A1 | 4/2014 | Price | |
| 2014/0095214 A1 | 4/2014 | Mathe et al. | |
| 2014/0129073 A1 | 5/2014 | Ferguson | |
| 2014/0136045 A1 | 5/2014 | Zhu et al. | |
| 2014/0136414 A1 | 5/2014 | Abhyanker | |
| 2014/0142799 A1 * | 5/2014 | Ferguson | G05D 1/00 |
| | | | 701/23 |
| 2014/0164126 A1 | 6/2014 | Nicholas et al. | |
| 2014/0188999 A1 | 7/2014 | Leonard et al. | |
| 2014/0195213 A1 * | 7/2014 | Kozloski | G06F 17/5009 |
| | | | 703/8 |
| 2014/0201037 A1 | 7/2014 | Mallawarachchi et al. | |
| 2014/0201126 A1 | 7/2014 | Zadeh | |
| 2014/0214255 A1 | 7/2014 | Dolgov et al. | |
| 2014/0222277 A1 | 8/2014 | Tsimhoni et al. | |
| 2014/0222577 A1 | 8/2014 | Abhyanker | |
| 2014/0282967 A1 | 9/2014 | Maguire | |
| 2014/0297116 A1 | 10/2014 | Anderson et al. | |
| 2014/0306833 A1 | 10/2014 | Ricci | |
| 2014/0309789 A1 | 10/2014 | Ricci | |
| 2014/0309806 A1 | 10/2014 | Ricci | |
| 2014/0309864 A1 | 10/2014 | Ricci | |
| 2014/0309891 A1 | 10/2014 | Ricci | |
| 2014/0310186 A1 | 10/2014 | Ricci | |
| 2014/0316671 A1 | 10/2014 | Okamoto | |
| 2014/0324268 A1 | 10/2014 | Montemerlo et al. | |
| 2014/0330479 A1 | 11/2014 | Dolgov | |

(56) References Cited

U.S. PATENT DOCUMENTS

| | | | |
|---|---|---|---|
| 2014/0358331 A1 | 12/2014 | Prada Gomez et al. | |
| 2014/0358353 A1 | 12/2014 | Ibanez-Guzman et al. | |
| 2015/0006005 A1 | 1/2015 | Yu et al. | |
| 2015/0006014 A1 | 1/2015 | Wimmer et al. | |
| 2015/0026092 A1 | 1/2015 | Abboud et al. | |
| 2015/0035685 A1 | 2/2015 | Strickland et al. | |
| 2015/0051778 A1 | 2/2015 | Mueller | |
| 2015/0057891 A1 | 2/2015 | Mudalige et al. | |
| 2015/0062340 A1 | 3/2015 | Datta et al. | |
| 2015/0062469 A1 | 3/2015 | Fleury | |
| 2015/0066282 A1 | 3/2015 | Yopp | |
| 2015/0066284 A1 | 3/2015 | Yopp | |
| 2015/0070178 A1 | 3/2015 | Kline | |
| 2015/0095190 A1 | 4/2015 | Hammad et al. | |
| 2015/0120331 A1 | 4/2015 | Russo et al. | |
| 2015/0134178 A1 | 5/2015 | Minoiu-Enache | |
| 2015/0141043 A1 | 5/2015 | Abramson | |
| 2015/0149021 A1 | 5/2015 | Duncan et al. | |
| 2015/0160019 A1 | 6/2015 | Biswal et al. | |
| 2015/0166059 A1 | 6/2015 | Ko | |
| 2015/0175070 A1 | 6/2015 | Attard et al. | |
| 2015/0178998 A1 | 6/2015 | Attard et al. | |
| 2015/0196256 A1 | 7/2015 | Venkatraman et al. | |
| 2015/0232065 A1 | 8/2015 | Ricci et al. | |
| 2015/0293994 A1 | 10/2015 | Kelly | |
| 2015/0338226 A1 | 11/2015 | Mason et al. | |
| 2015/0339639 A1 | 11/2015 | Choe | |
| 2015/0344038 A1* | 12/2015 | Stenneth | B60W 40/103 340/439 |
| 2016/0001781 A1 | 1/2016 | Fung et al. | |
| 2016/0026182 A1 | 1/2016 | Boroditsky et al. | |
| 2016/0075512 A1 | 3/2016 | Lert, Jr. | |
| 2016/0078695 A1 | 3/2016 | McClintic et al. | |
| 2016/0078758 A1 | 3/2016 | Basalamah | |
| 2016/0090100 A1 | 3/2016 | Oyama et al. | |
| 2016/0139594 A1 | 5/2016 | Okumura et al. | |
| 2016/0140507 A1 | 5/2016 | Stevens et al. | |
| 2016/0161950 A1* | 6/2016 | Frangou | B60W 30/12 701/27 |
| 2016/0176409 A1 | 6/2016 | Kirsch et al. | |
| 2016/0200317 A1* | 7/2016 | Danzl | B60K 28/06 701/25 |
| 2016/0303969 A1 | 10/2016 | Akula | |
| 2016/0334797 A1 | 11/2016 | Ross et al. | |
| 2016/0344737 A1 | 11/2016 | Anton | |
| 2016/0355192 A1 | 12/2016 | James et al. | |
| 2016/0363935 A1* | 12/2016 | Shuster | B60L 7/10 |
| 2016/0364823 A1 | 12/2016 | Cao | |
| 2017/0010613 A1 | 1/2017 | Fukumoto | |
| 2017/0129487 A1* | 5/2017 | Wulf | B60W 30/09 |
| 2017/0132917 A1* | 5/2017 | Ricci | G08G 1/0137 |

FOREIGN PATENT DOCUMENTS

| | | | |
|---|---|---|---|
| CN | 104900018 A | 9/2015 | |
| EP | 0582236 A1 | 2/1994 | |
| EP | 3130516 A1 * | 2/2017 | B60W 50/14 |
| WO | 2014058263 A1 | 4/2014 | |
| WO | 2014066721 A2 | 5/2014 | |
| WO | 2014147361 A1 | 9/2014 | |
| WO | 2014148975 A1 | 9/2014 | |
| WO | 2014148976 A1 | 9/2014 | |
| WO | 2015024616 A1 | 2/2015 | |
| WO | 2015056105 A1 | 4/2015 | |
| WO | 2015156146 A1 | 10/2015 | |

OTHER PUBLICATIONS

P. Mell et al., "The Nist Definition of Cloud Computing", National Institute of Standards and Technology, Information Technology Laboratory, Sep. 2011, pp. 1-7.

X. Jardin, "Terrifying dashcam video captures distracted teen drivers crashing while goofing off", Boing Boing, www.boingboing.net, Mar. 26, 2015, 1 page.

M. Fox, "Self-driving cars safer than those driven by humans: Bob Lutz", CNBC, www.cnbc.com, Sep. 8, 2014, 1 page.

Brownell, "Shared Autonomous Taxi Networks: An Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze Im Umbruch, Springer Berlin Heidelberg, 2015, pp. 539-549.

Jimenez et al.; "Autonomous collision avoidance system based on accurate knowledge of the vehicle surroundings"; Inst Engineering Technology-IET; IET Intelligent Transport Systems vol. 9, No. 1, pp. 105-117; 2015; England.

Anonymous, "Avoiding Crashes With Self-Driving Cars: Today's Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/GOOGLE-FILES-PATENT-FOR-SECOND-GEN-AUTONOMOUS-VEHICLE-WITHOUT-A-STEERING-WHEEL-BRAKE-PEDAL-MORE.HTML>.

C. Berger et al., "COTS-Architecture With a Real-Time OS for a Self-Driving Miniature Vehicle", SAFECOMP 2013—Workshop ASCOMS of the 32nd International Conference on Computer Safety, Reliability and Security, Sep. 2013, Toulouse, France, pp. 1-13.

U.S. Appl. No. 14/887,388, filed Oct. 20, 2015.

A. Abkowitz, "Do Self-Driving Cars Spell Doom for Auto Insurers?", Bloomberg L.P., Sep. 10, 2014, pp. 1-2.

Anonymous, "Self-Driving Cars and Insurance", Insurance Information Institute, Inc., Feb. 2015, pp. 1-3.

Gomes, Lee. "Google's Self-Driving Cars Still Face Many Obstacles / MIT Technology Review.", MIT Technology Review. Aug. 28, 2014. Web. <http://www.technologyreview.co,/news/530276/hidden-obstabscles-for-googles-self-driving-cars/>.

Smith, Mark. "Inovations: Emerging Trends in the Wheelchair Market." New Mobility Magazine, Aug. 1, 2014. Web. <http://www.newmobility.com/2014/08/emerging-trends/>.

Crothers, Brooke. "Google Now Reporting Self-Driving Car Accidents: Her, It's Not the Car's Fault". Forbes.Com, Jun. 8, 2015. <http://www.forbes.com/sites/brookecrothers/2015/06/08/google-now-reportibg-driverless-car-accidents/>.

Anonymous, 'System and Method to Target Advertisements for the Right Focus Group'. ip.com, No. 000218285, May 31, 2012, pp. 1-2.

Anonymous, "Car Built-in Mechanism to Enforce Mandatory Self-Driving Mode", ip.com, No. 000234916, Feb. 14, 2014, pp. 1-3.

T. Horberry et al., "Driver Distraction: The Effects of Concurrent in-Vehicle Tasks, Road Enviornment Complexity and Age on Driving Performance", Elsevier Ltd., Accident Analysis and Prevention, 38, 2006, pp. 185-191.

J. Miller, "Self-Driving Car Technologu's Benefits, Potential Risks, and Solutions", The Energy Collective, theenergycollective.com, Aug. 19, 2014, pp. 1-7.

J. O'Callaghan, "Inside the Mercedes Self-Guidubg Car That's Built for Luxurious Living in, Not Driving", Associated Newspapers Ltd., Daily Mail, dailymail.com.uk, Jan. 6, 2015, pp. 1-13.

J. Wei et al., "Towards a Viable Autonomous Driving Research Platform", IEEE, Intelegent Vehicles Symposium (IV), 2013, pp. 1-8.

J.Farrier, "Airlines Infuse Their Planes With Smells to Calm You Down", Neatorama, neatorama.com, Mar. 29, 2015, 1 Page.

(56) References Cited

OTHER PUBLICATIONS

T. Vanderbilt, "Let the Robot Drive: the Autonomous Car of the Future Is Here", Wired Magazine, Conde Nast, www.wired.com, Jan. 20, 2012. pp. 1-34.
Chen S, et al., A Crash Risk Assessment Model for Roas Curves. Inproceedings 20th International Technical Conference on the Enhanced Saftey of Vehicles., 2007. Lyon, France.
E. Lehrer, "The Insurance Implications of Google's Self-Driving Car", Insurance Journal, Right Street BLOH=G, May 28, 2014, pp. 1-2.
Anonymous, "Diagnostics Mechanism for Self-Driving Cars to Validate Self-Driving Capabilities", ip.com, Jun. 6, 2014, pp. 1-5. ip.com.

* cited by examiner

US 9,944,291 B2

CONTROLLING DRIVING MODES OF SELF-DRIVING VEHICLES

BACKGROUND

The present disclosure relates to the field of vehicles, and specifically to the field of self-driving vehicles. Still more specifically, the present disclosure relates to the field of controlling whether self-driving vehicles operate in autonomous mode or manual mode.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In one or more embodiments of the present invention, a method and/or computer program product controls an operational mode of a self-driving vehicle (SDV) that is initially being operated in a nominal autonomous mode. Detectors on an SDV detect an erratically driven vehicle (EDV) that is being operated in an unsafe manner within a predetermined distance of an SDV. In response to detecting the EDV, a driving mode device in the SDV changes an operational mode of the SDV from the nominal autonomous mode to an evasive autonomous mode.

In one or more embodiments of the present invention, a self-driving vehicle comprises a processor, a computer readable memory, a non-transitory computer readable storage medium, and first program instructions to detect, by detectors on an SDV, an erratically driven vehicle (EDV) that is being operated in an unsafe manner within a predetermined distance of an SDV, where the SDV is initially being operated in a nominal autonomous mode; and second program instructions to instruct a driving mode device in the SDV to change an operational mode of the SDV from the nominal autonomous mode to an evasive autonomous mode in response to detecting the EDV. The first and second program instructions are stored on the non-transitory computer readable storage medium for execution by one or more processors via the computer readable memory.

DETAILED DESCRIPTION

Figure 1:
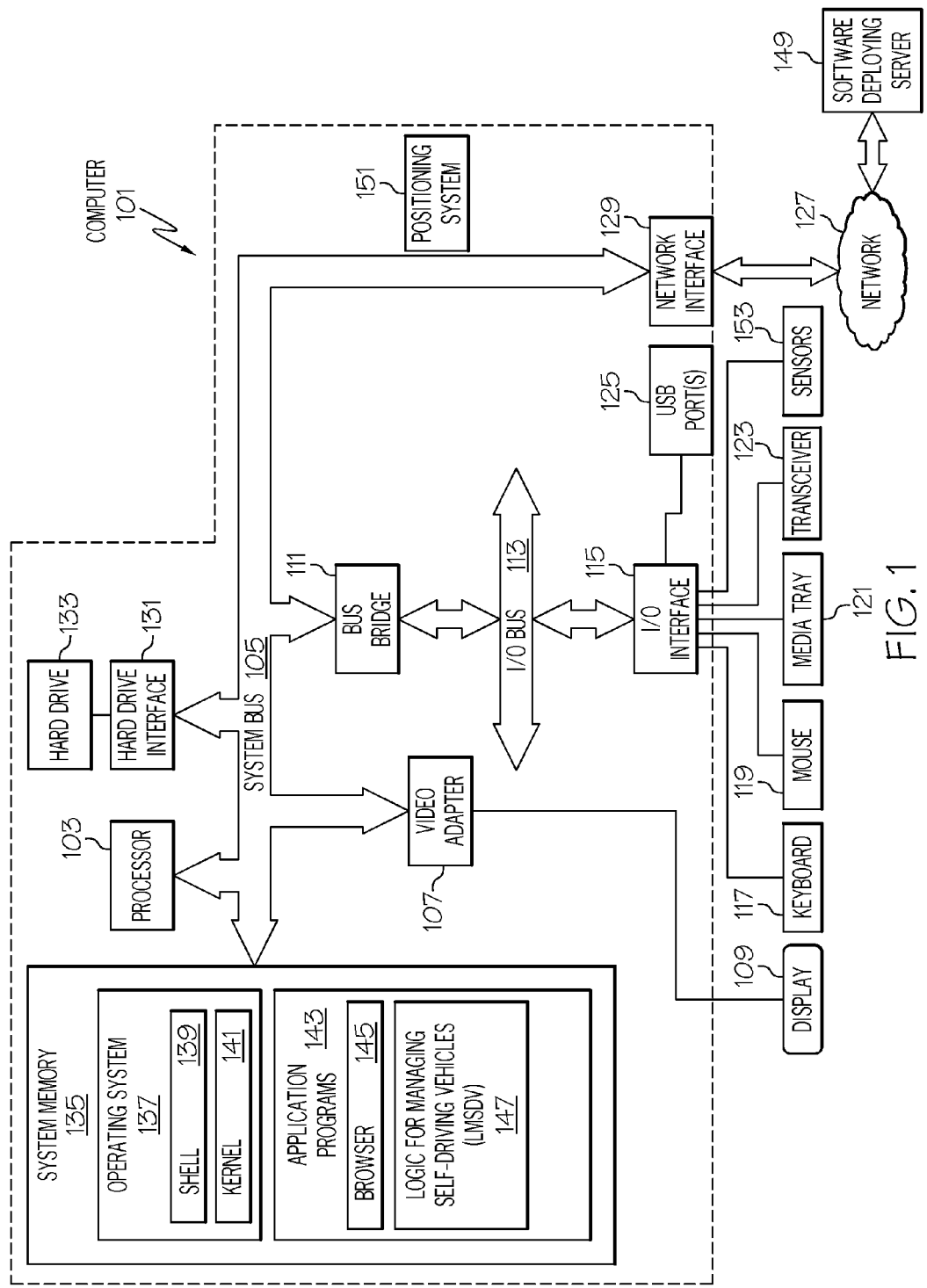
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or coordinating computer 201 shown in FIG. 2, and/or a self-driving vehicle (SDV) on-board computer 301 shown in FIG. 3, and/or a coordinating server 401 depicted in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., establishing communication among SDV 202, EDV 204, and/or coordinating server 401 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Self-Driving Vehicles (LMSDV) 147. LMSDV 147 includes code for implementing the processes described below, including those described in FIGS. 2-5. In one embodiment, computer 101 is able to download LMSDV 147 from software deploying server 149, including in an on-demand basis, wherein the code in LMSDV 147 is not downloaded until needed for execution. In one embodiment of the present invention, software deploying server 149 performs all of the functions associated with the present invention (including execution of LMSDV 147), thus freeing computer 101 from having to use its own internal computing resources to execute LMSDV 147.

Also within computer 101 is a positioning system 151, which determines a real-time current location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles including erratically driven vehicles as described herein, road obstructions, pavement, etc.) of that SDV, thus enabling it to be autonomously self-driven. Similarly, sensors 153 may be cameras, thermometers, moisture detectors, etc. that detect ambient weather conditions and other environmental conditions of a roadway upon which the SDV is traveling.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
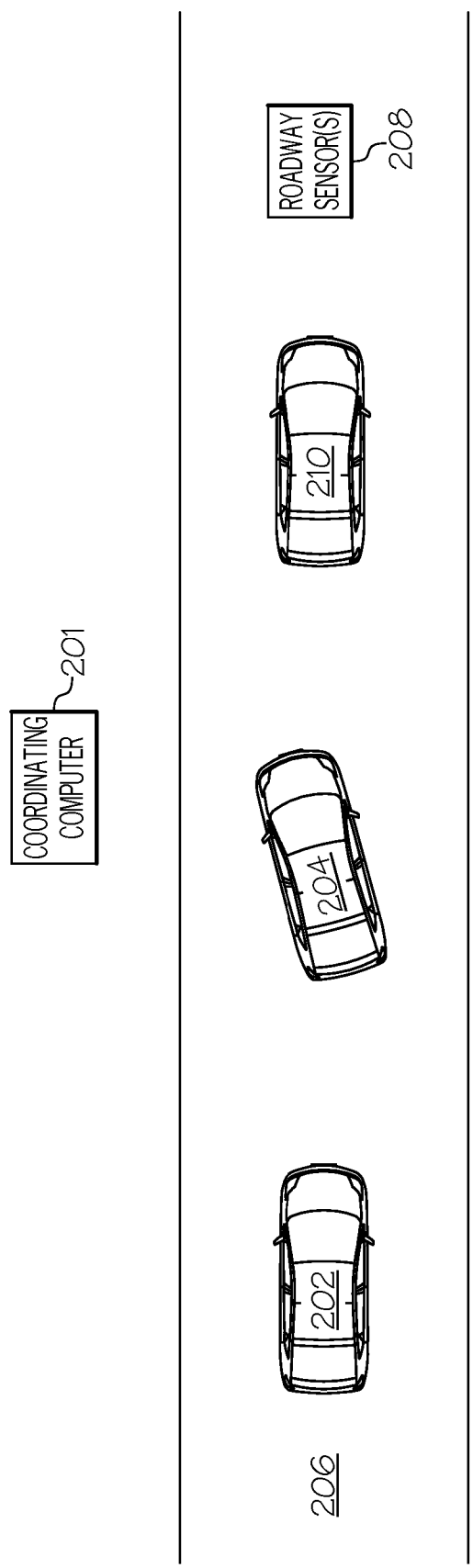
FIG. 2 illustrates an exemplary self-driving vehicle (SDV) traveling on a roadway in accordance with one or more embodiments of the present invention.

With reference now to FIG. 2, an exemplary self-driving vehicle (SDV) 202 and an erratically driven vehicle (EDV) 204 traveling along a roadway 206 in accordance with one or more embodiments of the present invention are presented. Roadway 206 may be a public roadway, a private roadway, a parking lot, a paved road, an unpaved road, and/or any other surface capable of supporting vehicles, which may be wheeled (e.g., cars), tracked (e.g., trains), or a combination thereof.

An EDV is defined as a vehicle that is being driven in a manner that has been predetermined to be unsafe, including but not limited to a manner in which movement is erratic. That is, EDV 204 is deemed to be an erratically driven vehicle if it is currently weaving in and out of traffic, not staying within lane dividers, going too fast or too slow for current road/traffic conditions, exceeding a posted speed limit, tailgating another vehicle, and/or being driven in any other manner that has been predetermined to be erratic or otherwise improper, and therefore is unsafe.

Additionally, EDV 204 is deemed in one or more embodiments to be an erratically driven vehicle if it is currently entering and leaving manual and autonomous modes at a high rate of change (e.g., the vehicle enters, leaves, enters, and leaves the mode above a certain rate for a unit time, as determined by an examination of an indicator of the mode on the vehicle). For example, if SDV 202 determines that EDV 204 has toggled modes (e.g., between manual mode and autonomous mode) 20 times in one minute, then EDV 204 is deemed to be erratically driven. This mode toggling can be displayed by an indicator (visual or aural) on SDV 202. That is, SDV on-board computer 301 in SDV 202 can monitor the driving mode device 307 in EDV 204, assuming that the SDV on-board computer 301 in the EDV 204 transmits the status/output of the driving mode device 307 in EDV 204 to other SDVs. If SDV 202 receives messages/signals from SDV 204 indicating that the output of the driving mode device 307 in the EDV 204 is toggling (switching) more than a predetermined frequency, then EDV 204 is deemed to be operating in an erratic/unsafe manner, and this information is represented on a warning light, tone speaker, etc. (not shown) in the cabin of SDV 202.

As indicated by its askew positioning in FIG. 2, EDV 204 is being driven in an erratic/unsafe manner. In one embodiment, EDV 204 is an SDV operating in autonomous mode (discussed below) whose systems are malfunctioning, thus resulting in the erratic/unsafe operations of EDV 204. In another embodiment, EDV 204 is either an SDV operating in manual mode (also discussed below), or is a non-SDV vehicle that is always driven in manual mode, such that a human driver is driving the EDV 204 in an erratic/unsafe manner.

In accordance with one or more embodiments of the present invention, SDV 202 utilizes on-board sensors and/or readings from roadway sensor(s) 208 to determine that EDV 204 is currently operating in an erratic/unsafe manner. In response to making this determination, on-board controllers (discussed below) on the SDV 202 adjust the controls of SDV 202 to provide additional distance between the SDV 202 and the EDV 204 (e.g., by causing SDV 202 to change lanes or to speed up or to slow down, thus providing more space between SDV 202 and EDV 204), and/or to perform other reactive actions (e.g., notifying the proper officials of the erratic driving nature of EDV 204, send suggestions to EDV 204, etc.).

Current conditions of the roadway 206, including weather conditions, traffic conditions, construction events, accident events, etc., can be determined and transmitted by a coordinating computer 201. That is, coordinating computer 201 is able to determine current roadway conditions based on internal sensors 153 shown in FIG. 1, and/or roadway sensor(s) 208 (e.g., mechanical, visual, and/or electrical sensors that are able to detect the number and speed of vehicles traveling on the roadway 206, the amount and/or type of precipitation on the roadway 206, the temperature of the roadway 206 and/or ambient air around the roadway 206, the movement of vehicles traveling along roadway 206, etc.), as well as information received from sensors and/or on-board computers within SDV 202 and/or EDV 204, and/or from information received by an information service (e.g., a weather station). In one or more embodiments, these roadway conditions are utilized in the decision regarding into which operational/driving mode the SDV 202 should be placed.

In accordance with one or more embodiments of the present invention, SDV 202 may be driven in "manual mode", "nominal autonomous mode", "evasive autonomous mode", or "stopping autonomous mode", each of which are referred to herein as an operational mode or a driving mode, where the terms "operational mode" and "driving mode" are synonymous and interchangeable.

As used and described herein, "manual mode" is defined as an SDV being at least partially under the input control of a human driver. That is, if SDV 202 is being steered by a human driver but has cruise control activated, then it is in manual mode, since SDV 202 is partially under the input control (steering) of the human driver. Thus, while in manual mode, even SDV 202 can operate as a traditional motor vehicle, in which a human driver controls the engine throttle, engine on/off switch, steering mechanism, braking system, horn, signals, etc. found on a motor vehicle. These vehicle mechanisms may be operated in a "drive-by-wire" manner, in which inputs to an SDV control processor 303 (shown in FIG. 3) by the driver result in output signals that control the SDV vehicular physical control mechanisms 305 (e.g., the engine throttle, steering mechanisms, braking systems, turn signals, etc.).

Figure 3:
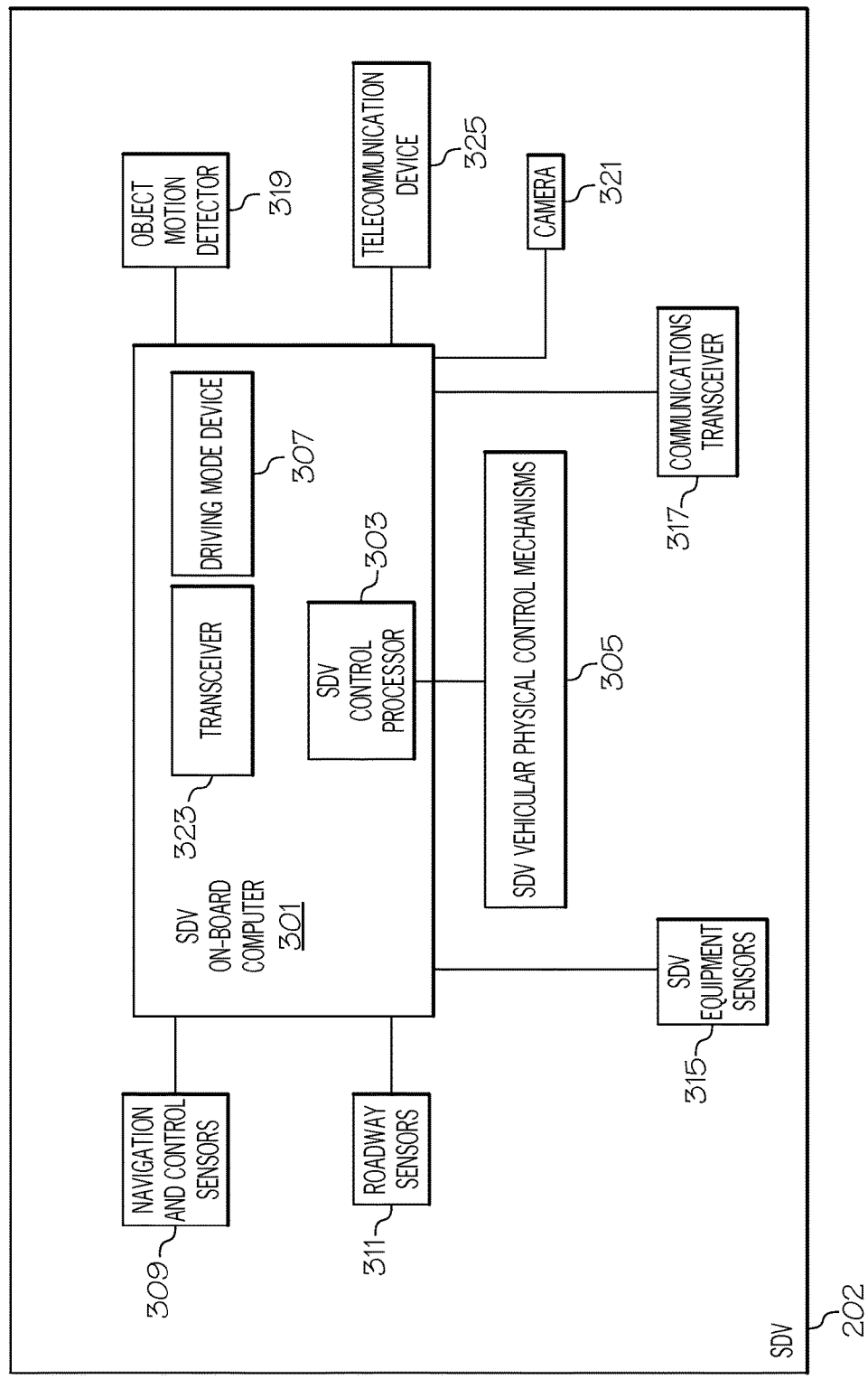
FIG. 3 depicts additional detail of control hardware within an SDV.

As used and described herein, "nominal autonomous mode" is defined as an SDV being totally controlled by hardware/software logic (e.g., SDV on-board computer 301 and/or driving mode device 307 and/or SDV control processor 303 shown in FIG. 3) without inputs from the human driver under roadway and/or SDV conditions that have been predetermined to be normal (i.e., "nominal"). That is, if steering, braking, throttle control, obstacle/vehicle avoidance, etc. are all under the control of hardware/software logic such as the SDV on-board computer 301 shown in FIG. 3, then SDV 202 is in an autonomous mode, including the "nominal autonomous mode" in which roadway conditions are normal. Roadway and/or SDV conditions are deemed to be normal/nominal if the mechanical systems of the SDV are operating properly, roadway conditions are not unduly hazardous (e.g., are not icy), and other vehicles are operating properly (e.g., are not operating in an erratic or otherwise unsafe manner). The factors used to determine if the SDV and/or roadway are nominal or not nominal are predetermined. That is, various operational parameters (e.g., loss of pressure in brake lines, ice on the roadway, the presence of an EDV within a predetermined distance of the SDV, etc.) are stored in a database. If these parameters/conditions are occurring, then nominal SDV/roadway conditions are not being met.

As used and described herein, "evasive autonomous mode" is defined as an SDV being totally controlled by hardware/software logic (e.g., SDV on-board computer 301 and/or driving mode device 307 and/or SDV control processor 303 shown in FIG. 3) without inputs from the human driver (similar to "nominal autonomous mode"), but under tighter restrictions than those under the nominal autonomous mode and with an increased focus on the detected EDV. That is, if sensors within SDV 202 detect a vehicle within a certain proximity to SDV 202 traveling in an erratic or other unsafe manner, then going into "evasive autonomous mode" (as instructed by the driving mode device 307 in FIG. 3) causes the SDV on-board computer 301 shown in FIG. 3 to execute instructions designed for conditions in which the SDV 202 is near the EDV 204. Such instructions will result in additional distance between the SDV 202 and the EDV 204 (e.g., by SDV 202 speeding up, SDV 202 slowing down, SDV 202 changing lanes, etc. to put more space between SDV 202 and EDV 204), and/or will cause the SDV 202 to issue alert warnings, direct the SDV on-board computer 301 to prioritize receipt of and response to sensor readings that are focused on the EDV 204, etc.

As used and described herein, "stopping autonomous mode" is defined as an SDV being totally controlled by hardware/software logic (e.g., SDV on-board computer 301 and/or driving mode device 307 and/or SDV control processor 303 shown in FIG. 3) without inputs from the human driver (similar to "nominal autonomous mode" or "evasive autonomous mode"), but now specifically designed to steer the SDV to a safe location (e.g., a roadway shoulder, a next exit, etc.) and stopping the SDV at that safe location.

In one or more embodiments of the present invention, a weighted voting system is used to weight the various variables used in making the decision to enter one or more of the above-described modes. Such inputs may include: votes by other nearby cars, a history of the driver of the EDV, a history of the efficiency of the control system of the SDV in avoiding collisions in adverse circumstances, etc. Such weighted voting approaches may be characterized primarily by three aspects—the inputs, the weights, and the quota. The inputs are ($I1, I2, \ldots, IN$). N denotes the total number of inputs. An input's weight (w) is the number of "votes" associated with the input. The quota (q) is the minimum number of votes required to "pass a motion," which in this case refers primarily to a decision made regarding into which control/driving mode the SDV is placed.

Additional details of one or more embodiments of the SDV 202 (which may have a same architecture as EDV 204 when enabled as an SDV) are presented in FIG. 3. As shown in FIG. 3, SDV 202 has an SDV on-board computer 301 that controls operations of the SDV 202. According to directives from a driving mode device 307, the SDV 202 can be selectively operated in manual mode or autonomous mode (including the nominal autonomous mode, evasive autonomous mode, and/or stopping autonomous mode described above). In a preferred embodiment, driving mode device 307 is a dedicated hardware device that selectively directs the SDV on-board computer 301 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the driving mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). By measuring the time it takes to receive back the emitted electromagnetic radiation, and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice on the roadway 206 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 206 is using light sensors.

Similarly, a dedicated camera 321 can be trained on roadway 206, in order to provide photographic images capable of being evaluated, thereby recognizing erratic vehicular operations. For example, sequences of photographic images can show the velocity and any change in direction of EDV 204, thus providing the recognition of the erratic/unsafe driving pattern for EDV 204.

Similarly, a dedicated object motion detector 319 (e.g., a radar transceiver capable of detecting Doppler shifts indicative of the speed and direction of movement of EDV 204) can be trained on roadway 206, in order to detect the movement of EDV 204, thus providing the recognition of the erratic/unsafe driving pattern for EDV 204.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc.

In one or more embodiments of the present invention, also within SDV 202 is a communications transceiver 317, which is able to receive and transmit electronic communication signals (e.g., RF messages) from and to other communications transceivers found in other vehicles, servers, monitoring systems, etc.

In one or more embodiments of the present invention, also within SDV 202 is a telecommunication device 325 (e.g., a smart phone, a cell phone, a laptop computer, etc.), which may be connected (e.g., via a near field communication—NFC connection) to the SDV on-board computer 301. Thus, alerts regarding EDV 204 may be transmitted to a smart phone within the EDV 204 or another vehicle or agency (e.g., a local law enforcement agency).

Returning to FIG. 2, one or more embodiments of the present invention are directed to determining whether to place the SDV 202 into evasive autonomous mode or stopping autonomous mode, based on the presence of the EDV 204 and/or based on the qualifications/abilities/condition of the driver of the EDV 204 and/or based on the condition/state of mechanical and/or control equipment of the EDV 204, particularly when operating in SDV mode. In one or more embodiments, this decision is also based on roadway conditions and/or vehicle conditions, as well as other factors. That is, if the movement of EDV 204 is so hazardous that the prudent step would be to simply pull over to the side of the road, then the system will place SDV 202 into stopping autonomous mode, thereby pulling the SDV 202 over to the side of the road (or onto the next available exit).

In order to determine whether or not to switch from evasive autonomous mode (or even nominal autonomous mode) to stopping autonomous mode, one or more embodiments of the present invention utilize a metric of observed conditions. For example, assume that SDV equipment sensors 315 in FIG. 3 detect that the thickness of brake linings on SDV 202 is below (i.e., worn down—thinner than) a predefined limit (e.g., less than 2 mm of brake pad remain on the brake calipers), that object motion detector 319 and/or camera 321 have identified EDV 204 as changing lanes (i.e., swerving) more frequently than another predefined limit (e.g., every five seconds over the course of 30 seconds), and that roadway sensors 311 have determined that roadway 206 (shown in FIG. 2) has a film of ice more than a predefined thickness (e.g., more than ½ inch). These parameters are summed. If their summation exceeds predefined limit, then SDV 202 is automatically placed into stopping autonomous mode. If not, then SDV 202 stays in its current operational mode (e.g., nominal autonomous mode or evasive autonomous mode). These parameters may be weighted, such that the value associated with swerving is given a higher weight (e.g., 2×) than the condition of the brake pads (e.g., 0.5×).

In an embodiment of the present invention, once the parameters that caused SDV 202 to go into evasive autonomous mode and/or stopping autonomous mode cease, then the SDV on-board computer 301 directs SDV 202 to return to nominal autonomous mode or manual mode. For example, if the object motion detector 319 and/or camera 321 detect that EDV 204 has exited roadway 206; or that EDV 204 has pulled far enough away from SDV 202 (e.g., one mile) to no longer pose a threat to SDV 202; or that EDV 204 has started driving safely (e.g., EDV 204 has entered an autonomous mode and/or sent a message to SDV 202 indicating as such, and movements of EDV 204 captured by object motion detector 319 and/or camera 321 confirm that EDV 204 is now driving safely); etc., then the SDV on-board computer 301 in SDV 202 will cause SDV 202 to revert back to nominal autonomous mode or manual mode.

Note that the parameters/summation/weighting just described for going from one autonomous mode to another autonomous mode may also be used in determining if the SDV 202 should go from manual mode to one of the autonomous modes.

Other factors considered in determining which operational mode to place the SDV into include the driving ability of the driver of the SDV 202, the driving ability of the driver of the EDV 204, the accuracy of environmental and other sensors (e.g., sensors 153 shown in FIG. 1) mounted on the SDV 202, and/or learned traffic patterns for vehicles on the roadway 206. For example, if the driver of the SDV 202 has a profile and/or driving history that is exceptionally high, then the system will "trust" the driver to maneuver around the EDV 204. Alternatively, if the profile/history of the driver of the EDV 204 is exceptionally poor, then the system will take proactive steps to place the SDV 202 into a cautious mode (e.g., evasive autonomous mode) even if the movement of the EDV 204 has not exceeded predefined criteria (e.g., the EDV 204 is not currently swerving, speeding, etc.). Other factors (e.g., sensor accuracy, environmental/weather conditions, learned traffic patterns for vehicles on the roadway, etc.) will be used in various embodiments to determine how conservative the system will be when determining which type of autonomous mode or the manual mode will be utilized by the SDV. For example, if the roadway is icy, sensors on the SDV 202 are having trouble accurately detecting movement of the EDV 204, the roadway 206 has a high incidence of accidents, etc., then the system will take the SDV 202 from the nominal autonomous mode to the evasive autonomous mode sooner than if the roadway was dry, the sensors were operating efficiently, the roadway had a history of few accidents, etc.

Figure 4:
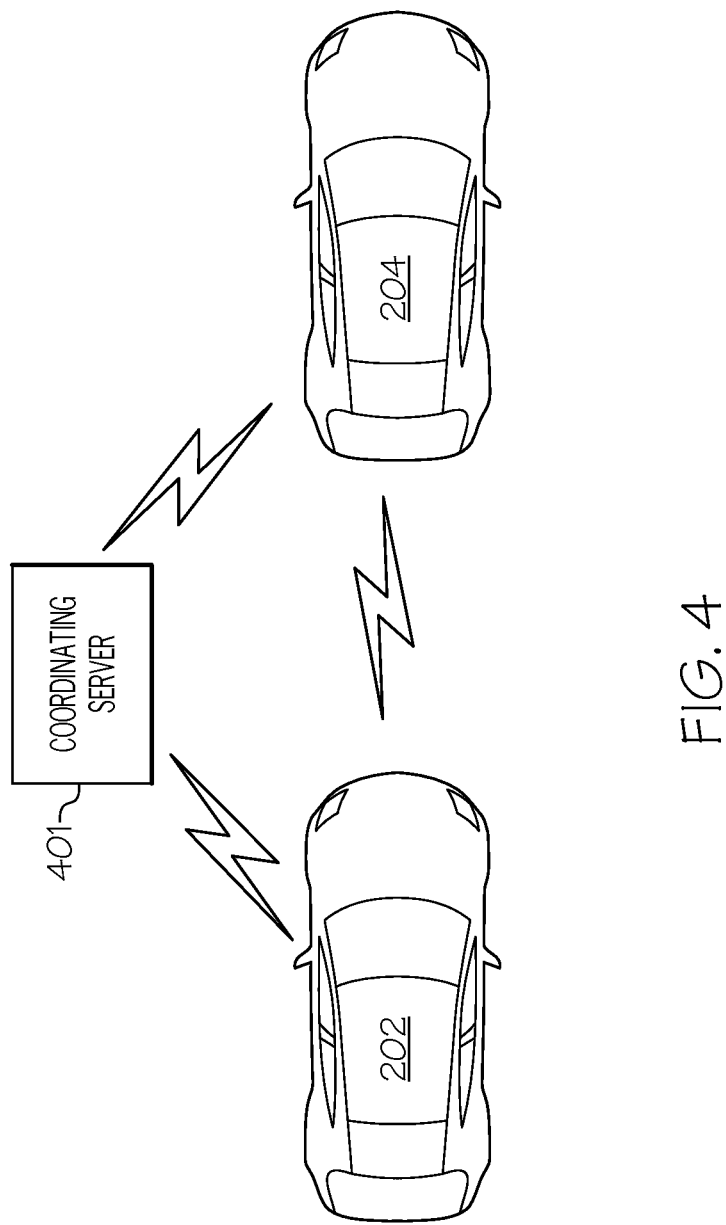
FIG. 4 depicts communication linkages among SDVs and a coordinating server.

Messages/sensor readings describing factors used by the SDV 202 to decide which operational/driving mode to use may come from the SDV 202 itself, another vehicle (e.g., EDV 204), the coordinating computer 201, and/or the coordinating server 401 shown in FIG. 4. Coordinating server 401 may coordinate the control of the driving mode (i.e., autonomous or manual) of the SDV 202 and/or EDV 204 (if equipped to operate in SDV mode), and/or may receive current roadway conditions of roadway 206 and/or the state of the driver of EDV 204. As depicted in FIG. 4, coordinating server 401 and/or SDV 202 and/or EDV 204 are able to communicate with one another wirelessly, using a wireless transceiver (e.g., transceiver 123 shown in FIG. 1) that is found in each of the coordinating server 401 and/or SDV 202 and/or EDV 204.

Figure 5:
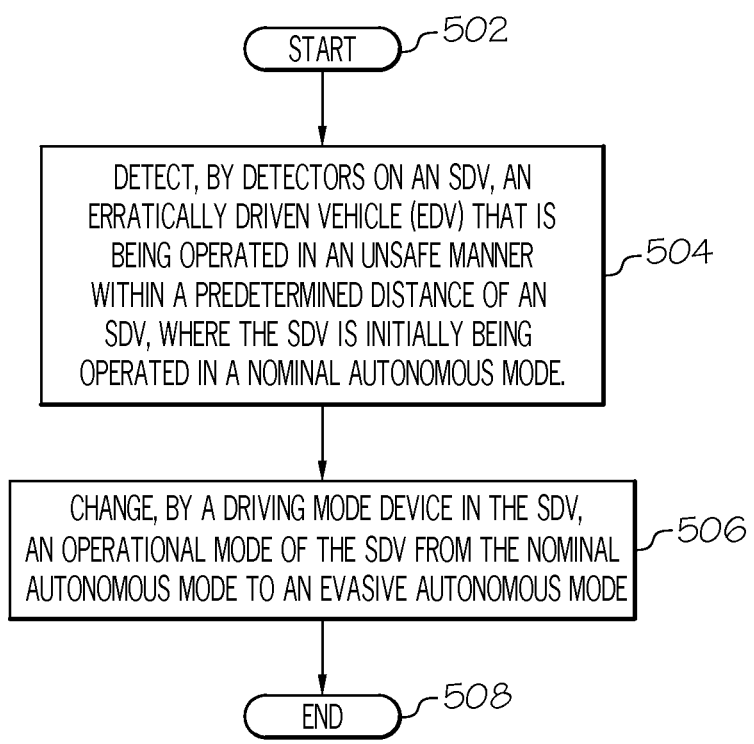
FIG. 5 is a high-level flow chart of one or more steps performed by one or more processors to control a driving mode of an SDV in accordance with one or more embodiments of the present invention.

With reference now to FIG. 5, a high-level flow chart of one or more steps performed by one or more processors to control an operational mode of an SDV in accordance with one or more embodiments of the present invention is presented. Note that various actions described for the present invention may be performed by the SDV on-board computer 301 shown in FIG. 3, the monitoring computer 401 shown in FIG. 4, and/or the cloud computing environment 50 shown in FIG. 7.

After initiator block 502, one or more physical detectors (e.g., roadway sensors 311, camera 321, and/or object motion detector 319 shown in FIG. 3; roadway sensor(s) 208 shown in FIG. 2; and/or sensors 153 shown in FIG. 1 when incorporated into coordinating computer 201 shown next to roadway 206 in FIG. 2) detect an erratically driven vehicle (EDV), such as EDV 204 shown in FIG. 2. The EDV is being operated in an unsafe manner within a predetermined distance (e.g., within 300 feet) of an SDV (e.g., SDV 202 shown in FIG. 2), as depicted in block 504. As described herein, the SDV is initially being operated in a nominal autonomous mode (defined above).

As described in block 506, in response to the physical detectors detecting the EDV within the predetermined distance of the SDV, a driving mode device (e.g., driving mode device 307 in FIG. 3) in the SDV changes an operational mode of the SDV from the nominal autonomous mode to an evasive autonomous mode.

The flow-chart ends at terminator block 508.

In an embodiment of the present invention, a transceiver (e.g., communication transceiver 317 shown in FIG. 3) on the SDV transmits an alert to other SDVs describing the EDV. For example, assume that SDV 202 has detected EDV 204 driving in an unsafe/erratic manner. SDV 202 will then send a warning to SDV 210, alerting SDV 210 of the presence and behavior of EDV 204, thus allowing SDV 210 to engage the evasive autonomous mode in its own on-board system and/or to otherwise respond to the presence of EDV 204.

In an embodiment of the present invention, a transceiver (e.g., communication transceiver 317 shown in FIG. 3) on the SDV transmits an alert to an authority agency describing the EDV. For example, assume that SDV 210 is a police vehicle, and/or that coordinating computer 201 is monitored by a local law enforcement agency. The SDV 202 will transmit a message to the police vehicle and/or local law enforcement agency (e.g., via the coordinating computer 201) alerting them to the presence and behavior of EDV 204, thus giving them the opportunity to take intervening steps (e.g., pull the EDV 204 over) in order to protect the public safety.

In one embodiment of the present invention, the decision regarding which mode to place the SDV into (manual mode, nominal autonomous mode, evasive autonomous mode, or stopping autonomous mode) is further based on the current condition of the roadway. Thus, assume again that the SDV 202 shown in FIG. 2 is traveling on a roadway (e.g., roadway 206 shown in FIG. 2). One or more processors (e.g., within SDV on-board computer 301) receive sensor readings from multiple sensors (e.g., roadway sensor(s) 208 shown in FIG. 2). In one embodiment, each of the multiple sensors detects a different type of current condition of the roadway. Based on the sensor readings (and thus the current roadway condition of the roadway), the driving mode device (e.g., driving mode device 307 shown in FIG. 3) further adjusts the operational mode. For example, if the roadway conditions are clear and dry, then the driving mode device may cause the SDV to revert back to nominal autonomous mode from the evasive autonomous mode. However, if the roadway conditions are dark and icy, then the driving mode device may cause the SDV to shift operational control from the evasive autonomous mode to the stopping autonomous mode.

In an embodiment of the present invention, the processor(s) weight each of the sensor readings for different current conditions of the roadway (e.g., snow on the roadway is weighted higher than rain on the roadway, but less than ice on the roadway). The processor(s) sum the weighted sensor readings for the different current conditions of the roadway, and determine whether the summed weighted sensor readings exceed a predefined level (e.g., some particular numerical value). In response to determining that the summed weighted sensor readings exceed a predefined level, the on-board SDV control processor adjusts the operational mode of the SDV accordingly.

In one embodiment of the present invention, the decision to place the SDV into a new type of autonomous mode (e.g., evasive autonomous mode or stopping autonomous mode) is based on the driver of the SDV being part of a cohort of drivers that share certain traits. That is, in one embodiment of the present invention assume that the SDV 202 shown in FIG. 2 is traveling on roadway 206. One or more processors (e.g., within coordinating computer 401 shown in FIG. 4) retrieve driver profile information about the human driver of the SDV, and then assign the human driver of the SDV to a cohort of drivers traveling on the roadway in other vehicles (where the human driver of the SDV shares more than a predetermined quantity of traits with members of the cohort of drivers). The processor(s) retrieve traffic pattern data for the other vehicles while traveling on the roadway, and examine that traffic pattern data to determine a first traffic flow of the multiple vehicles (e.g., while operating in the evasive autonomous mode described above) and a second traffic flow of the multiple SDVs (while operating in the nominal autonomous mode described above). In response to determining that the first traffic flow has a higher accident rate than the second traffic flow, the processor(s) change the operational mode of the SDV from the evasive autonomous mode back to the nominal autonomous mode, since the data shows that the evasive autonomous mode is actually more dangerous than simply leaving the SDV in the nominal autonomous mode, including when driving near the EDV.

Similarly and in one or more embodiments of the present invention, the decision to place the SDV into a manual mode (e.g., switching from evasive autonomous mode into manual mode) is based on the driver of the SDV being part of a cohort of drivers that share certain traits. That is, again assume that the SDV 202 shown in FIG. 2 is traveling on roadway 206. One or more processors (e.g., within coordinating computer 401 shown in FIG. 4) retrieve driver profile information about the human driver of the SDV, and then assign the human driver of the SDV to a cohort of drivers traveling on the roadway in other vehicles (where the human driver of the SDV shares more than a predetermined quantity of traits with members of the cohort of drivers). The processor(s) retrieve traffic pattern data for the other vehicles while traveling on the roadway, and examine that traffic pattern data to determine a first traffic flow of the multiple vehicles (e.g., while operating in the evasive autonomous mode described above) and a second traffic flow of the multiple SDVs (while operating in the manual mode described above). In response to determining that the first traffic flow has a higher accident rate than the second traffic flow, the processor(s) change the operational mode of the SDV from the evasive autonomous mode to the manual mode, since the data shows that the evasive autonomous mode is actually more dangerous than allowing the driver to manually respond to roadway conditions, including the presence of an EDV.

In another embodiment of the present invention, the decision regarding which mode to use (e.g., one of the autonomous modes or the manual mode) is based on the driver of the EDV 204 being a member of a cohort (i.e., by sharing one or more traits with members of the cohort) that has a history of safe/unsafe driving. Based on this driving history of the cohort and the fact that the EDV driver shares common traits with its members, the system will place the SDV into the best-fit operational/driving mode.

In one embodiment of the present invention, the decision to place the SDV in manual or one of the autonomous modes described herein is further dependent on the current mechanical condition of the SDV (e.g., the condition of the tires, the condition of the brakes, the condition of the headlights, the condition of the windshield wipers, the condition of the engine, the condition of the transmission, the condition of the cooling system, etc.). Thus, one or more processor(s) (e.g., within the SDV on-board computer 301 shown in FIG. 3) receive operational readings from one or more operational sensors (e.g., SDV equipment sensors 315 shown in FIG. 3) on the SDV, which detect a current state of mechanical equipment on the SDV. Based on the received operational readings, the processor(s) detect a mechanical fault (e.g., faulty brakes, bald tires, etc.) with the mechanical equipment on the SDV. In response to detecting the mechanical fault with the mechanical equipment on the SDV, the operational mode device further adjusts the operational mode of the SDV (e.g., the operational mode device may change the operational mode of the SDV from the evasive autonomous mode to a stopping autonomous mode).

As described herein, the driving mode device 307 along with the SDV on-board computer 301 shown in FIG. 3 provides a process for selectively switching between various types of autonomous modes and/or a manual mode. However, if such switching back and forth occurs too frequently, safety issues may arise. For example, if the driving mode device in FIG. 3 switches control of the SDV 202 from the manual mode to the autonomous mode, and then switches control of the SDV 202 back to the manual mode a few seconds later, the driver and/or SDV will likely become confused and/or ineffective.

Therefore, in one embodiment of the present invention, a predefined time limit and/or physical distance is set between switching back and forth between operational modes. For example, based on historical data that describes how long the current driver (and/or drivers from a cohort of drivers that have similar traits/characteristics as the current driver) needs to recover from relinquishing control of the SDV to the autonomous controller, the predefined time limit may be one minute. Similarly, based on historical data that describes how far the current driver must travel in order to recover from relinquishing control of the SDV to the autonomous controller, the predefined physical distance may be one mile. Therefore, if the system has switched from the manual mode to the autonomous mode, then one minute must pass and/or one mile must be traversed by the SDV before control can be returned back to the driver (e.g., manual mode is re-activated).

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
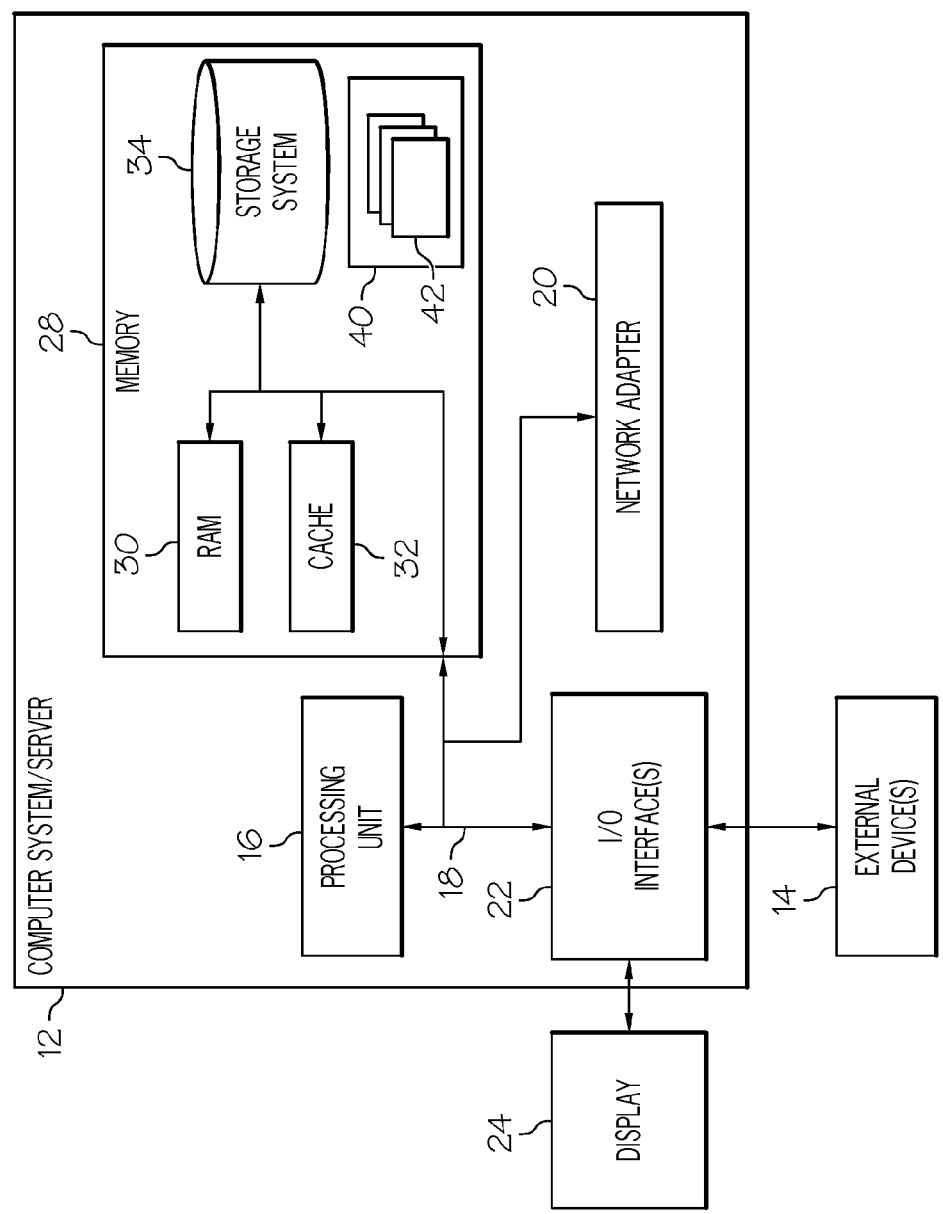
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
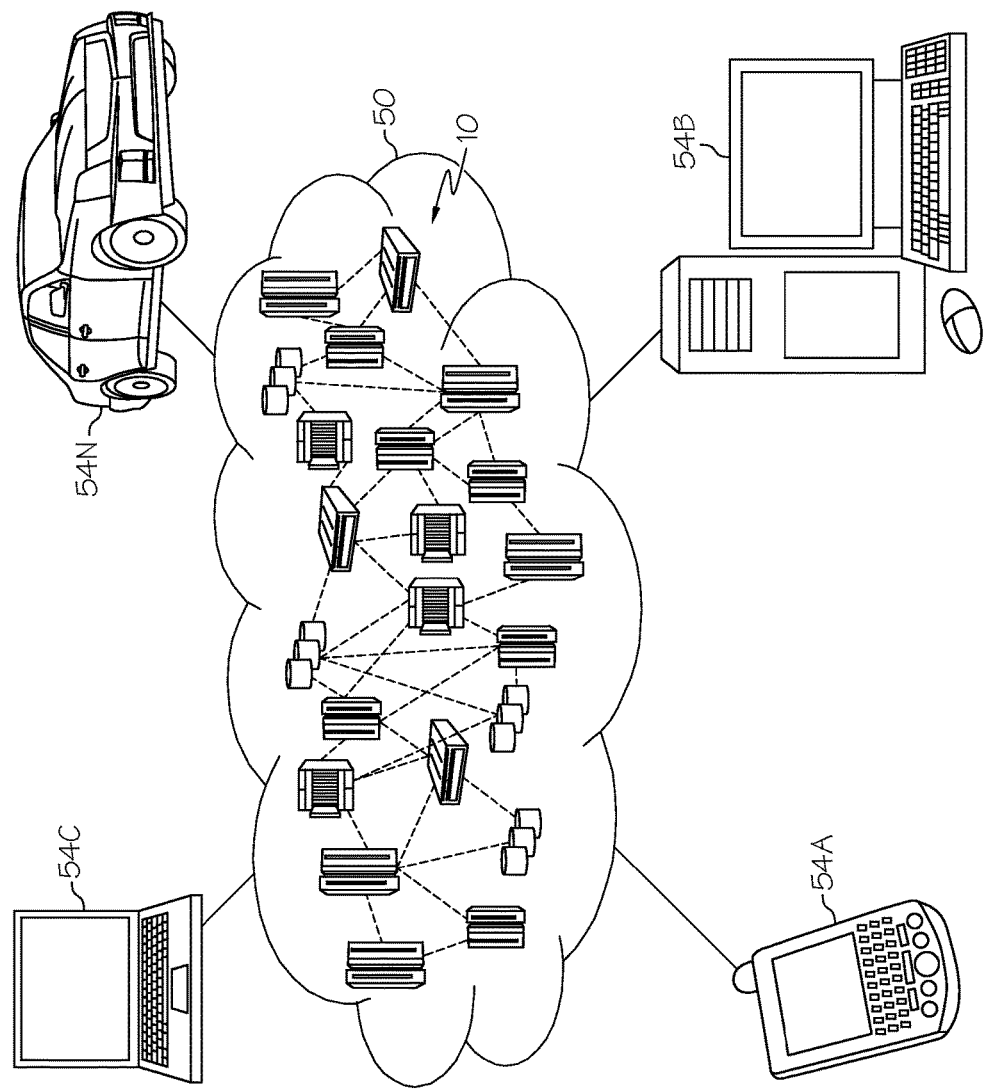
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
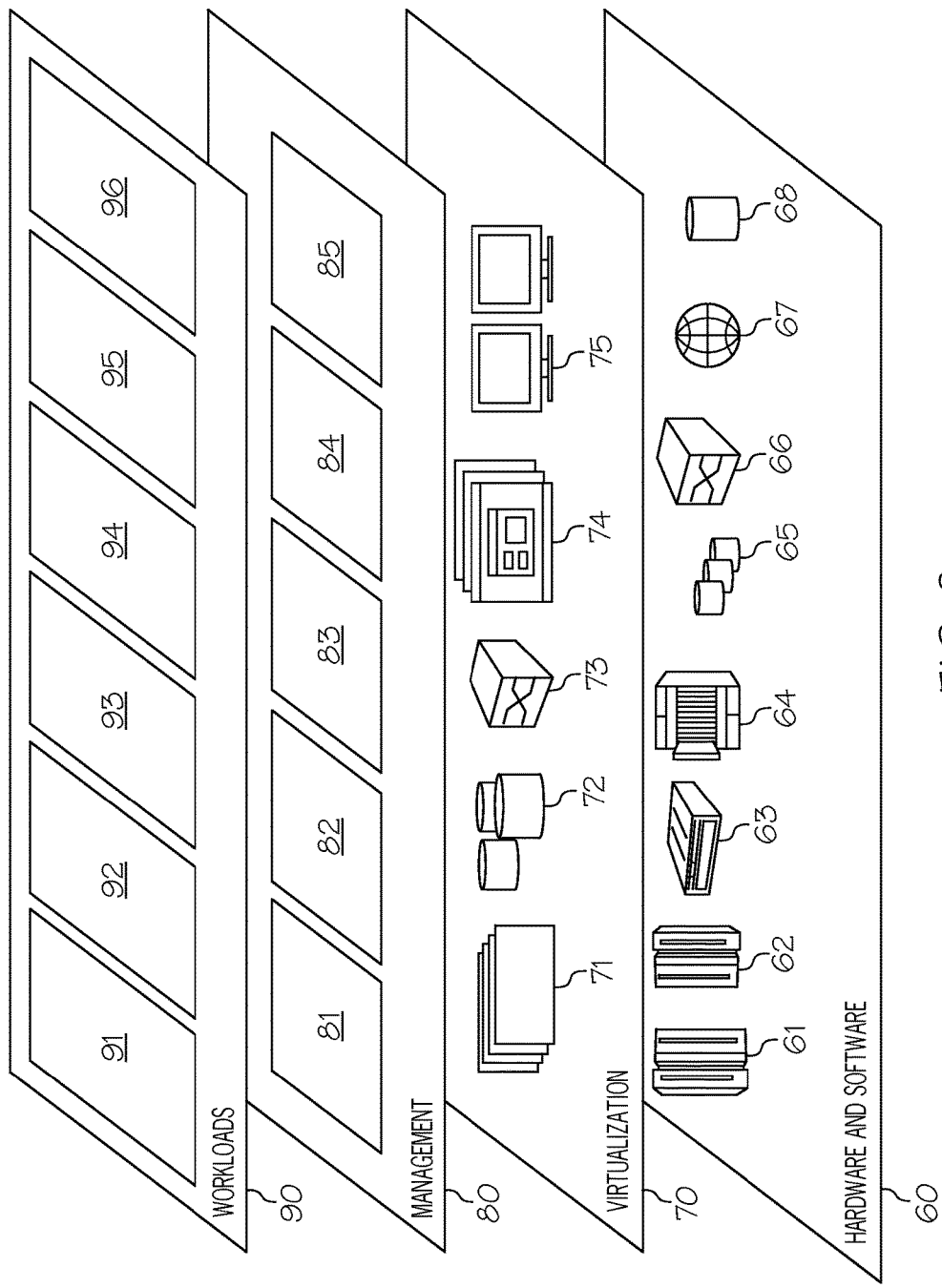
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for selectively setting operational/driving control of an SDV to manual mode or one of the autonomous modes described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for controlling an operational mode of a self-driving vehicle (SDV), the method comprising:
    detecting, by one or more physical detectors, an erratically driven vehicle (EDV) that is being operated in an unsafe manner within a predetermined distance of an SDV, wherein the SDV is initially being operated in a nominal autonomous mode;
    in response to the one or more physical detectors detecting the EDV, changing, by an operational mode device in the SDV, an operational mode of the SDV from the nominal autonomous mode to an evasive autonomous mode;
    retrieving, by one or more processors, traffic pattern data for other SDVs;
    examining, by one or more processors, the traffic pattern data to determine a first traffic flow of the other SDVs while operating in the evasive autonomous mode;
    examining, by one or more processors, the traffic pattern data to determine a second traffic flow of the other SDVs while operating in a manual mode; and
    in response to determining that the first traffic flow has a higher accident rate than the second traffic flow, changing, by the operational mode device, the operational mode of the SDV from the evasive autonomous mode to the manual mode.

2. The method of claim 1, further comprising:
    transmitting, by a transceiver on the SDV, an alert to other SDVs describing the EDV.

3. The method of claim 1, further comprising:
    transmitting, by a transceiver on the SDV, an alert to an authority agency describing the EDV.

4. The method of claim 1, further comprising:
    detecting, based on sensor readings from a roadway sensor, a current roadway condition of a roadway upon which the SDV and the EDV are traveling; and
    further adjusting, by the operational mode device, the operational mode of the SDV based on the current roadway condition of the roadway upon which the SDV and the EDV are traveling.

5. The method of claim 1, wherein the SDV and the EDV are traveling on a roadway, and wherein the processor-implemented method further comprises:
    switching the operational mode of the SDV from the manual mode to the evasive autonomous mode;
    retrieving, by one or more processors, driver profile information about a human driver of the SDV;
    assigning, by one or more processors, the human driver of the SDV to a cohort of drivers who have traveled on the roadway in other SDVs, wherein the human driver of the SDV shares more than a predetermined quantity of traits with members of the cohort of drivers who have traveled in the other SDVs; and
    in response to assigning the human driver of the SDV to the cohort of drivers who have traveled on the roadway in other SDVs, switching the operational mode of the SDV from the evasive autonomous mode to the manual mode.

6. The method of claim 1, wherein the SDV and the EDV are traveling on a roadway, and wherein the method further comprises:
    switching the operational mode of the SDV from the manual mode to the evasive autonomous mode;
    receiving, by one or more processors, sensor readings from multiple sensors, wherein each of the multiple sensors detects a different type of current condition of the roadway;
    weighting, by one or more processors, each of the sensor readings for different current conditions of the roadway;
    summing, by one or more processors, weighted sensor readings for the different current conditions of the roadway;
    determining, by one or more processors, whether the summed weighted sensor readings exceed a predefined level; and
    in response to determining that the summed weighted sensor readings exceed the predefined level, changing, by the operational mode device, the operational mode of the SDV from the evasive autonomous mode to a stopping autonomous mode.

7. The method of claim 1, further comprising:
    switching, by one or more processors, the operational mode of the SDV from the manual mode to the evasive autonomous mode;

receiving, by one or more processors, operational readings from one or more SDV operational sensors on the SDV, wherein the SDV operational sensors detect a current state of mechanical equipment on the SDV;

detecting, by the one or more processors and based on received operational readings, a mechanical fault with the mechanical equipment on the SDV; and in response to detecting the mechanical fault with the mechanical equipment on the SDV, changing, by the operational mode device, the operational mode of the SDV from the evasive autonomous mode to a stopping autonomous mode.

8. A computer program product for controlling an operational mode of a self-driving vehicle (SDV), the computer program product comprising a non-transitory computer readable storage medium having program code embodied therewith, the program code readable and executable by a processor to perform a method comprising:

detecting, by one or more physical detectors, an erratically driven vehicle (EDV) that is being operated in an unsafe manner within a predetermined distance of an SDV, wherein the SDV and the EDV are traveling on a roadway, and wherein the SDV is initially being operated in a nominal autonomous mode;

in response to the one or more physical detectors detecting the EDV, changing, by an operational mode device in the SDV, an operational mode of the SDV from the nominal autonomous mode to an evasive autonomous mode;

retrieving driver profile information about a human driver of the SDV;

assigning the human driver of the SDV to a cohort of drivers who have traveled on the roadway in other SDVs, wherein the human driver of the SDV shares more than a predetermined quantity of traits with members of the cohort of drivers who have traveled in the other SDVs; and in response to assigning the human driver of the SDV to the cohort of drivers who have traveled on the roadway in other SDVs, switching the operational mode of the SDV from the evasive autonomous mode to a manual mode.

9. The computer program product of claim 8, wherein the method further comprises:

transmitting, by a transceiver on the SDV, an alert to other SDVs describing the EDV.

10. The computer program product of claim 8, wherein the method further comprises:

transmitting, by a transceiver on the SDV, an alert to an authority agency describing the EDV.

11. The computer program product of claim 8, wherein the method further comprises:

detecting, based on sensor readings from a roadway sensor, a current roadway condition of a roadway upon which the SDV and the EDV are traveling; and further adjusting, by the operational mode device, the operational mode of the SDV based on the current roadway condition of the roadway upon which the SDV and the EDV are traveling.

12. The computer program product of claim 8, wherein the method further comprises:

switching the operational mode of the SDV from the manual mode to the evasive autonomous mode;

retrieving traffic pattern data for the other SDVs as they traveled on the roadway;

examining the traffic pattern data to determine a first traffic flow of the other SDVs while operating in the evasive autonomous mode on the roadway;

examining the traffic pattern data to determine a second traffic flow of the other SDVs while operating in a manual mode on the roadway; and in response to determining that the first traffic flow has a higher accident rate than the second traffic flow, changing, by the operational mode device, the operational mode of the SDV from the evasive autonomous mode to the manual mode.

13. The computer program product of claim 8, wherein the method further comprises:

switching the operational mode of the SDV from the manual mode to the evasive autonomous mode;

receiving sensor readings from multiple sensors, wherein each of the multiple sensors detects a different type of current condition of the roadway;

weighting each of the sensor readings for different current conditions of the roadway;

summing weighted sensor readings for the different current conditions of the roadway;

determining whether the summed weighted sensor readings exceed a predefined level; and in response to determining that the summed weighted sensor readings exceed the predefined level, changing, by the operational mode device, the operational mode of the SDV from the evasive autonomous mode to a stopping autonomous mode.

14. The computer program product of claim 8, wherein the method further comprises:

switching the operational mode of the SDV from the manual mode to the evasive autonomous mode;

receiving operational readings from one or more SDV operational sensors on the SDV, wherein the SDV operational sensors detect a current state of mechanical equipment on the SDV;

detecting, based on received operational readings, a mechanical fault with the mechanical equipment on the SDV; and in response to detecting the mechanical fault with the mechanical equipment on the SDV, changing, by the operational mode device, the operational mode of the SDV from the evasive autonomous mode to a stopping autonomous mode.

15. A self-driving vehicle comprising:

a processor, a computer readable memory, and a non-transitory computer readable storage medium;

first program instructions to detect, by one or more physical detectors on an SDV, an erratically driven vehicle (EDV) that is being operated in an unsafe manner within a predetermined distance of an SDV, wherein the SDV is initially being operated in a nominal autonomous mode;

second program instructions to instruct an operational mode device in the SDV to change an operational mode of the SDV from the nominal autonomous mode to an evasive autonomous mode in response to detecting the EDV;

third program instructions to retrieve traffic pattern data for other SDVs;

fourth program instructions to examine the traffic pattern data to determine a first traffic flow of the other SDVs while operating in the evasive autonomous mode;

fifth program instructions to examine the traffic pattern data to determine a second traffic flow of the other SDVs while operating in the nominal autonomous mode; and sixth program instructions to, in response to determining that the first traffic flow has a higher accident rate than the second traffic flow, instruct the operational mode device to change the operational mode of the SDV from the evasive autonomous mode back to the nominal autonomous mode; and wherein the first, second, third, fourth, fifth, and sixth program instructions are stored on the non-transitory computer readable storage medium for execution by one or more processors via the computer readable memory.

16. The self-driving vehicle of claim 15, further comprising:
seventh program instructions to instruct a transceiver on the SDV to transmit an alert to other SDVs describing the EDV; and wherein the seventh program instructions are stored on the non-transitory computer readable storage medium for execution by one or more processors via the computer readable memory.

17. The self-driving vehicle of claim 15, further comprising:
seventh program instructions to instruct a transceiver on the SDV to transmit an alert to an authority agency describing the EDV; and wherein the seventh program instructions are stored on the non-transitory computer readable storage medium for execution by one or more processors via the computer readable memory.

18. The self-driving vehicle of claim 15, further comprising:
seventh program instructions to receive sensor readings from a roadway sensor describing a current roadway condition of a roadway upon which the SDV and the EDV are traveling; and eighth program instructions to further adjust, via the operational mode device, the operational mode of the SDV based on the current roadway condition of the roadway upon which the SDV and the EDV are traveling; and wherein the seventh and eighth program instructions are stored on the non-transitory computer readable storage medium for execution by one or more processors via the computer readable memory.

19. The self-driving vehicle of claim 15, wherein the SDV and the EDV are traveling on a roadway, wherein the SDV is a first SDV, and wherein the self-driving vehicle further comprises:
seventh program instructions to switch the operational mode of the SDV from the nominal autonomous mode to the evasive autonomous mode;
eighth program instructions to retrieve driver profile information about a human driver of the first SDV;
ninth program instructions to assign the human driver of the first SDV to a cohort of drivers traveling on the roadway in other SDVs, wherein the human driver of the first SDV shares more than a predetermined quantity of traits with members of the cohort of drivers of the other SDVs; and
tenth program instructions to in, response to assigning the human driver of the SDV to the cohort of drivers who have traveled on the roadway in other SDVs, switch the operational mode of the SDV from the evasive autonomous mode to a manual mode;
and wherein the seventh, eighth, ninth, and tenth program instructions are stored on the non-transitory computer readable storage medium for execution by one or more processors via the computer readable memory.

20. The self-driving vehicle of claim 15, further comprising:
seventh program instructions to switch the operational mode of the SDV from the nominal autonomous mode to the evasive autonomous mode;
eighth program instructions to receive operational readings from one or more SDV operational sensors on the SDV, wherein the SDV operational sensors detect a current state of mechanical equipment on the SDV;
ninth program instructions to detect, based on received operational readings, a mechanical fault with the mechanical equipment on the SDV; and
tenth program instructions to instruct the operational mode device to change the operational mode of the SDV from the evasive autonomous mode to a stopping autonomous mode in response to detecting the mechanical fault with the mechanical equipment on the SDV; and wherein the seventh, eighth, ninth, and tenth program instructions are stored on the non-transitory computer readable storage medium for execution by one or more processors via the computer readable memory.

* * * * *